(12) United States Patent
Pelc et al.

(10) Patent No.: US 11,274,791 B2
(45) Date of Patent: Mar. 15, 2022

(54) VEHICULAR FLUID CAPTURE SYSTEM

(71) Applicants: Michael Francis Pelc, Bayonne, NJ (US); Stanley Pelc, Springfield, NJ (US)

(72) Inventors: Michael Francis Pelc, Bayonne, NJ (US); Stanley Pelc, Springfield, NJ (US)

( * ) Notice: Subject to any disclaimer, the term of this patent is extended or adjusted under 35 U.S.C. 154(b) by 38 days.

(21) Appl. No.: 16/948,321

(22) Filed: Sep. 14, 2020

(65) Prior Publication Data

US 2021/0080059 A1 Mar. 18, 2021

Related U.S. Application Data

(60) Provisional application No. 62/899,530, filed on Sep. 12, 2019.

(51) Int. Cl.
| | |
|---|---|
| *F16N 31/02* | (2006.01) |
| *F01M 11/10* | (2006.01) |
| *B60W 30/08* | (2012.01) |
| *B60R 21/02* | (2006.01) |
| *B60R 21/01* | (2006.01) |
| *B60R 21/00* | (2006.01) |
| *B60R 21/23* | (2006.01) |

(52) U.S. Cl.
CPC .............. *F16N 31/02* (2013.01); *F01M 11/10* (2013.01); *B60R 21/23* (2013.01); *B60R 2021/0027* (2013.01); *B60R 2021/01252* (2013.01); *B60R 2021/0293* (2013.01); *B60W 2030/082* (2013.01); *B60W 2422/90* (2013.01)

(58) Field of Classification Search
CPC .. F16N 31/02; F01M 11/10; B60W 2030/082; B60R 2021/0027; B60R 2021/0293
See application file for complete search history.

(56) References Cited

U.S. PATENT DOCUMENTS

| | | | |
|---|---|---|---|
| 3,915,255 A | 10/1975 | Springer | |
| 3,980,153 A | 9/1976 | Andrews | |
| 5,499,653 A | 3/1996 | Kerry | |
| 5,732,785 A * | 3/1998 | Ran | B60R 19/205 |
| | | | 180/271 |
| 5,934,379 A * | 8/1999 | Østlyngen | B60H 1/00978 |
| | | | 169/46 |
| 5,992,794 A | 11/1999 | Rotman et al. | |

(Continued)

FOREIGN PATENT DOCUMENTS

WO 9318943 A1 9/1993

*Primary Examiner* — Kevin R Steckbauer
(74) *Attorney, Agent, or Firm* — Dunlap Bennett & Ludwig, PLLC

(57) ABSTRACT

A proactive, prophylactic vehicle fluid capture system that embodies an inflatable air-diaper disposed under the engine. The inflatable air-diaper is deployed upon an indication of a sufficient crash event, wherein the deployed inflatable air-diaper catches the above-mentioned vehicular fluid prior to contact with the surrounding ground, thereby lessening the negative environmental impact and clean-up time resulting from the crash event. The inflatable air-diaper may deploy with peripheral sidewalls to facilitate the retention of the hazardous fluid on the inflatable air-diaper. The inflatable air-diaper is made of material adapted to absorb these hazardous vehicular fluids.

9 Claims, 2 Drawing Sheets

(56) References Cited

U.S. PATENT DOCUMENTS

| | | | |
|---|---|---|---|
| 6,923,483 B2* | 8/2005 | Curry | B60R 19/205 |
| | | | 180/274 |
| 7,000,725 B2* | 2/2006 | Sato | B60R 21/2338 |
| | | | 180/274 |
| 7,055,640 B2 | 6/2006 | Cook | |
| 7,350,851 B2 | 4/2008 | Barvosa-Carter et al. | |
| 7,434,872 B2* | 10/2008 | Steller | B60R 19/18 |
| | | | 296/155 |
| 8,801,035 B2* | 8/2014 | Kim | B60R 19/205 |
| | | | 280/770 |
| 8,955,634 B2* | 2/2015 | Bergenheim | B60R 21/2342 |
| | | | 180/274 |
| 9,206,575 B2* | 12/2015 | Miller | E02B 15/045 |
| 10,047,489 B2* | 8/2018 | Miller | E02B 15/045 |
| 10,760,234 B2* | 9/2020 | Miller | E02B 15/047 |
| 2005/0087998 A1* | 4/2005 | Curry | B60R 21/2338 |
| | | | 293/107 |
| 2005/0236213 A1 | 10/2005 | Hosoya | |
| 2008/0093868 A1* | 4/2008 | Steller | B60R 19/18 |
| | | | 293/142 |
| 2011/0155398 A1 | 6/2011 | Holland et al. | |
| 2011/0318109 A1* | 12/2011 | Miller | E02B 15/045 |
| | | | 405/68 |
| 2016/0160465 A1* | 6/2016 | Miller | E02B 15/0814 |
| | | | 405/68 |
| 2017/0036626 A1* | 2/2017 | Barbat | B60R 19/205 |
| 2018/0354438 A1* | 12/2018 | Baccouche | B62D 27/065 |
| 2019/0001919 A1* | 1/2019 | Farooq | B60R 21/36 |
| 2019/0203437 A1* | 7/2019 | Miller | E02B 15/0814 |
| 2021/0080059 A1* | 3/2021 | Pelc | F01M 11/10 |
| 2021/0087767 A1* | 3/2021 | Miller | E02B 15/0828 |
| 2021/0268983 A1* | 9/2021 | Tse | B60R 21/0134 |

* cited by examiner

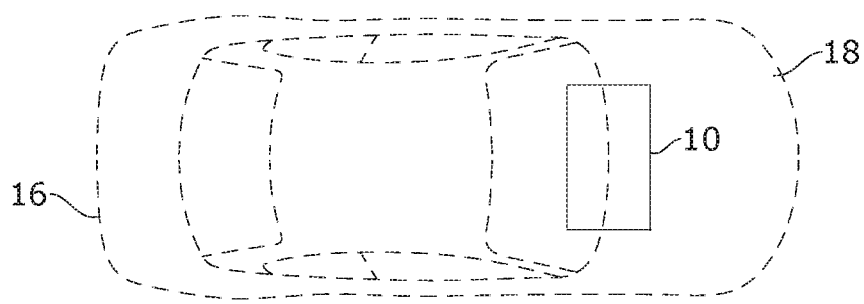

FIG.4

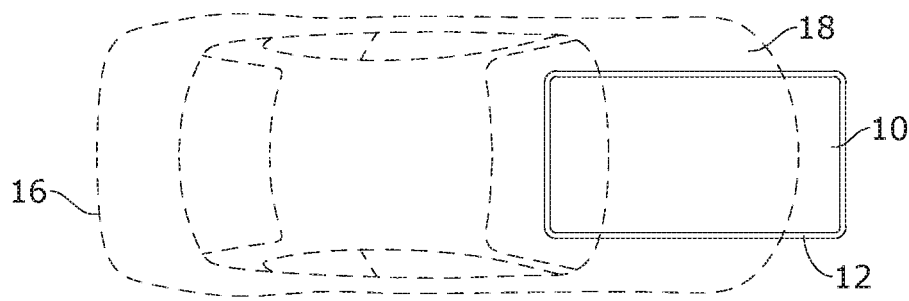

FIG.5

| AN AIRBAG MADE OF ABSORBENT MATERIAL IS INSTALLED UNDERNEATH THE ENGINE COMPARTMENT |
|---|
| WHEN THE VEHICLES CRASH SENSOR DETECTS A LARGE ENOUGH IMPACT, THE ABSORBENT AIRBAG IS DEPLOYED, CREATING A CATCH BASIN BENEATH THE ENGINE |
| ANY HAZARDOUS FLUIDS LEAKING FROM THE DAMAGED ENGINE ARE CAUGHT IN THE ABSORBENT AIRBAG, AVOIDING CONTACT WITH THE GROUND |
| THE DEPLOYED AIRBAG AND CAPTURED FLUIDS ARE PROPERLY DISPOSED OF, AND A NEW AIRBAG IS INSTALLED BELOW THE ENGINE COMPARTMENT |

FIG.6

VEHICULAR FLUID CAPTURE SYSTEM

CROSS-REFERENCE TO RELATED APPLICATION

This application claims the benefit of priority of U.S. provisional application No. 62/899,530, filed Sep. 12, 2019, the contents of which are herein incorporated by reference.

BACKGROUND OF THE INVENTION

The present invention relates to vehicular safety systems and, more particularly, an airbag deployment system with absorbent material designed to stop and/or reduce the hazardous materials from leaking on the ground after an automobile accident. As a result, oil and other fluid tends to collect in the airbag/diaper instead of leaking on the roadway.

A large amount of pollution on the roadways is fluid lose as a result of an automobile accidents. These pollutants leaches into the environment, harming habitats and degrading the aesthetic appeal of the nature that surrounds the road.

Furthermore, traffic delays are caused by the slow clean-up of these fluids. The current clean up method at a crash site where fluid has leaked is outdated. These methods aim to soak up as much as possible with an absorbent material after the fluid is already on the ground. After they absorb as much as possible, clean-up normally involves granular absorbents brushed with a broom. Additionally, the portion of the fluids that remain in the vehicle continue to spill and leak during transport of the wrecked vehicle, and still continues to leak after the wrecked vehicle reaches its final destination—e.g., the junk yard—and so the environmental degradation goes far beyond the crash site.

Automobile accidents are unpleasant no matter how you look at them, but it is also important to consider the environmental impact caused by all the accident and post-accident fluid, chemicals, and compounds cast on the roadway. Today's approach is flawed because it is a reaction to the spill contaminating the ground but does not prevent the contamination in the first place.

As can be seen, there is a need for an airbag deployment system with absorbent material designed to stop and/or reduce the hazardous materials from leaking on the ground after an automobile accident. The present invention embodies a proactive, prophylactic approach that prevents leaking hazardous fluid from contacting the road surface through an inflatable air-diaper. With less or no contaminants hitting the road, the less contaminant in the surrounding environment and the quicker the clean-up and traffic flow to continue.

Additionally, the post-crash airbag deployment system can further wrap around the wrecked vehicle to prevent continued leakage while the wrecked vehicle is disposed of.

SUMMARY OF THE INVENTION

In one aspect of the present invention, fluid capture system for a vehicle experiencing a crash event includes: an inflatable air-diaper movable from a pre-crash length to a post-crash length extending between and beyond a rearmost end and a forwardmost end of a pre-crash engine, underneath thereof.

In another aspect of the present invention, the fluid capture system for a vehicle experiencing a crash event includes the following: an inflatable air-diaper movable from a pre-crash length to a post-crash length extending between and beyond a rearmost end and a forwardmost end of a pre-crash engine, underneath thereof, wherein the pre-crash length extends one-quarter to one-half that of the post-crash length, and wherein the pre-crash length does not extend to a mid-point of the pre-crash engine; the inflatable air-diaper made of fluid-absorbent material; the post-crash length has a plurality of sidewalls inflated along a periphery thereof, wherein the plurality of sidewalls extend upward, and wherein the plurality of sidewalls are deflated along the pre-crash length; and a crash sensor operatively associated with the inflatable air-diaper and the vehicle for triggering the post-crash length.

These and other features, aspects and advantages of the present invention will become better understood with reference to the following drawings, description and claims.

BRIEF DESCRIPTION OF THE DRAWINGS

FIG. 4 is a schematic top view of an exemplary embodiment of the present invention with the vehicle 16 shown in phantom, illustrating the installation location of airbag 10;

FIG. 5 is a schematic top view of an exemplary embodiment of the present invention with the vehicle 16 shown in phantom, illustrating the installation location of airbag 10 once deployed during a crash; and FIG. 6 is a flow chart of an exemplary embodiment of the present invention.

DETAILED DESCRIPTION OF THE INVENTION

Figure 1:
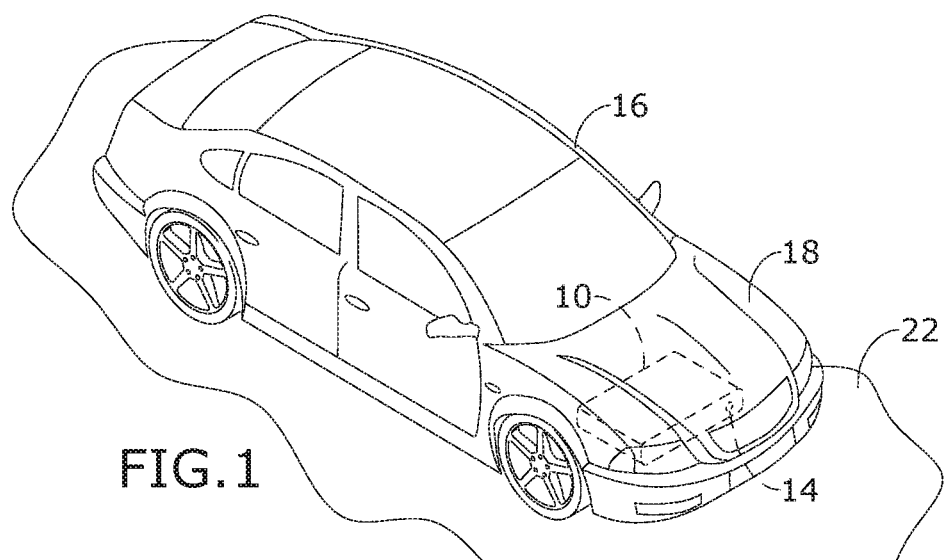
FIG. 1 is a schematic view of an exemplary embodiment of an undeployed airbag 10 and a crash sensor 14 of the present invention.
Figure 2:
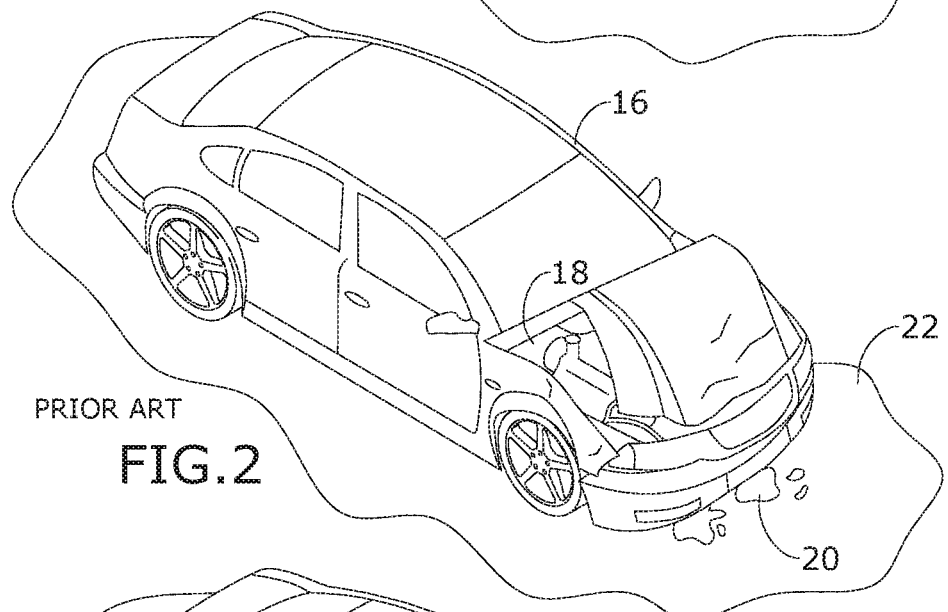
FIG. 2 is a schematic view of the prior art, illustrating hazardous fluid 20 leaking on the ground 22 after an accident involving the vehicle 16.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a proactive, prophylactic vehicle fluid capture system that embodies an inflatable air-diaper disposed under the engine, wherein upon an indication of a sufficient crash event the inflatable air-diaper is deployed to catch the above-mentioned vehicular fluid prior to its contact with the surrounding ground, thereby lessening the negative environmental impact and clean-up time resulting from the crash event. The inflatable air-diaper may deploy with peripheral sidewalls to facilitate the retention of the hazardous fluid on the inflatable air-diaper. The inflatable air-diaper is made of material adapted to absorb these hazardous vehicular fluids. The material may include polypropylene fabric, hardened polypropylene, other materials providing a cellulose fiber for absorbing hazardous material.

Referring now to FIGS. 1 through 6, the present invention may include a vehicular engine fluid capture system embodying an inflatable air-diaper 10 made of absorbent material adapted to capture and absorb the hazardous fluids 20 associated with an engine 18 of a vehicle 16 immediately after a sufficient crash event. The inflatable air-diaper 10 may be centrally disposed under the engine 18 of the vehicle. An inflation mechanism (not shown) akin to those of airbags may be coupled to the inflatable air-diaper 10 for sufficiently timely inflation upon an indication of the sufficient crash event, wherein a forward-most edge of the deflated air-diaper 10 is urged forward through inflation/air pressure to a position protruding six to twenty-four inches from a location of a pre-crash front fender, as illustrated in FIG. 5. Thus inflated/deployed air-diaper 10 extends beyond a rear-most and a forward-most point of the pre-crash engine.

A crash sensor 14 may be operatively associated with both the inflation mechanism and the inflatable air-diaper 10. The crash sensor 14 could be set to recognize a sufficient level of impact, which would deploy the inflatable air-diaper 10 underneath the automobile 16. The sufficient level of impact would be predetermined to be enough force that sufficient amount of the hazardous fluid 20 would more likely than not otherwise contact the ground 22 surrounding vehicle 16. The crash sensor 14 would provide the indication to the inflation mechanism to deploy the inflatable air-diaper 10 under the vehicle 16 to collect said hazardous fluid 20. The installation and operation of the inflatable air-diaper 10 of the present invention may go hand and hand with the vehicle's current airbag deployment system.

In any event, during a crash, the vehicle's crash sensor(s) 14 provide crucial information to an air-diaper electronic controller unit (ECU), including collision type, angle, and severity of impact. Using this information, an air-diaper ECU's crash algorithm determines if the crash event meets the criteria for deployment and triggers various firing circuits to deploy the air-diaper 10 outside the vehicle 16 through a pyrotechnic process that is designed to be used once. The air-diaper 10 in the vehicle 16 may be controlled by a central air-diaper 10 control unit (ACU), a specific type of ECU. The ACU monitors a number of related sensors within the vehicle 16, including accelerometer, impact sensors, wheel-speed sensors, gyroscopes, and brake pressure sensors.

Figure 3:
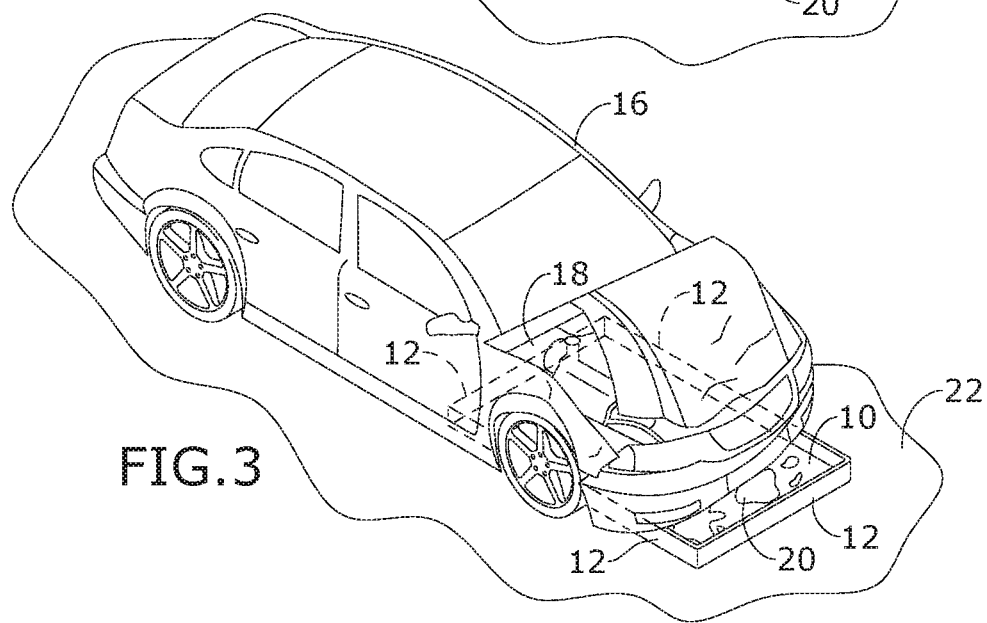
FIG. 3 is a schematic view of an exemplary embodiment of the present invention, illustrating a post-crash condition/length with the airbag deployed and the hazardous fluid 20 being captured within peripheral side walls 12 and absorbed by the airbag material.

The deployed inflatable air-diaper 10 would act as the absorbent material that is currently being used and help reduce the amount spilling on the roadway. Additionally, the inflated air-diaper 10 may provide peripheral sidewalls 12 so that the upper longitudinal surface of the inflated air-diaper 10 acts as a catchment for the hazardous fluids, as illustrated in FIG. 3. Optionally, part of the design would include a way to filter and recycle the fluid.

The pre-crash inflatable air-diaper 10 may be installed under the vehicle 16 in the location illustrated in FIG. 4. The installation may be by way of bracketing or engagement of pre-existing or added-on sheathing along the underside of the vehicle 16.

It should be understood, of course, that the foregoing relates to exemplary embodiments of the invention and that modifications may be made without departing from the spirit and scope of the invention as set forth in the following claims.

What is claimed is:

1. A fluid capture system of a vehicle experiencing a crash event comprising:
    an inflatable air-diaper movable from a pre-crash length to a post-crash length extending between and beyond a rearmost end and a forwardmost end of a pre-crash engine, underneath thereof.

2. The fluid capture system of a vehicle experiencing a crash event of claim 1, wherein the pre-crash length extends one-quarter to one-half that of the post-crash length.

3. The fluid capture system of a vehicle experiencing a crash event of claim 1, wherein the pre-crash length does not extend to a mid-point of the pre-crash engine.

4. The fluid capture system of a vehicle experiencing a crash event of claim 1, wherein the post-crash length has a plurality of sidewalls inflated along a periphery thereof, wherein the plurality of sidewalls extends upward.

5. The fluid capture system of a vehicle experiencing a crash event of claim 4, wherein the plurality of sidewalls is deflated along the pre-crash length.

6. The fluid capture system of a vehicle experiencing a crash event of claim 1, wherein the inflatable air-diaper is made of a fluid-absorbent material.

7. The fluid capture system of a vehicle experiencing a crash event of claim 1, further comprising a crash sensor operatively associated with the inflatable air-diaper and the vehicle for triggering the post-crash length.

8. The fluid capture system of a vehicle experiencing a crash event of claim 6, wherein the fluid-absorbent material comprises a polypropylene fabric.

9. A fluid capture system of a vehicle experiencing a crash event comprising:
    an inflatable air-diaper movable from a pre-crash length to a post-crash length extending between and beyond a rearmost end and a forwardmost end of a pre-crash engine, underneath thereof, wherein the pre-crash length extends one-quarter to one-half that of the post-crash length, and wherein the pre-crash length does not extend to a mid-point of the pre-crash engine;
    the inflatable air-diaper comprising a polypropylene fabric;
    the post-crash length has a plurality of sidewalls inflated along a periphery thereof, wherein the plurality of sidewalls extend upward, and wherein the plurality of sidewalls are deflated along the pre-crash length; and
    a crash sensor operatively associated with the inflatable air-diaper and the vehicle for triggering the post-crash length.

* * * * *